United States Patent [19]

Gilleland

[11] Patent Number: 5,042,532

[45] Date of Patent: Aug. 27, 1991

[54] EXPANDABLE TUBE APPARATUS FOR REPAIRING PIPELINES

[75] Inventor: Frank W. Gilleland, Orlando, Fla.

[73] Assignee: Cues, Inc., Orlando, Fla.

[21] Appl. No.: 387,818

[22] Filed: Aug. 1, 1989

[51] Int. Cl.5 .............................................. F16L 55/18
[52] U.S. Cl. ......................................... 138/98; 138/97
[58] Field of Search .................... 138/97, 98; 405/150, 405/154; 29/402.09; 264/36, 269

[56] References Cited

U.S. PATENT DOCUMENTS

| | | | |
|---|---|---|---|
| 2,583,316 | 1/1952 | Bannister | 138/97 |
| 3,700,265 | 10/1972 | Dufour et al. | 138/97 |
| 4,109,684 | 8/1978 | Fernandez | 138/97 |
| 4,207,130 | 6/1980 | Barber | 138/97 |
| 4,346,922 | 8/1982 | Ohtsuga et al. | 138/97 |
| 4,347,018 | 8/1982 | Wrightson et al. | 138/97 |
| 4,386,629 | 6/1983 | Cook et al. | 138/98 |
| 4,589,447 | 5/1986 | Kane et al. | 138/98 |
| 4,647,072 | 3/1987 | Westman | 138/97 |

Primary Examiner—James E. Bryant, III
Attorney, Agent, or Firm—Epstein, Edell & Retzer

[57] ABSTRACT

Pipeline repair and leak sealing are effected by unrolling a tube, using an inflatable mandrel disposed inside the tube, to radially expand a stretchable and circumferentially continuous gasket or sealant sleeve into flush contact with the pipeline interior. Before actuation, the tube is constrained in a rolled-up condition by a shrink-wrap sleeve of plastic film that may be sealed at its ends to an interior film sleeve in order to protect the tube against moisture. When fully expanded, the tube includes longitudinally-extending edges that overlap and are secured together by adhesive issued from a rupturable package disposed proximate one of the edges so as to be caused to burst as the edges approach overlapped positions. An outer sleeve of scrim material surrounds the tacky or gum-like gasket sleeve to facilitate handling and movement of the assembly in the pipeline. When the tube and gasket sleeve are expanded, the scrim material becomes embedded in the tacky gasket sleeve material which thereby protrudes through the scrim interstices to assure proper sealing and compression of the gasket sleeve against the pipeline interior wall.

43 Claims, 3 Drawing Sheets

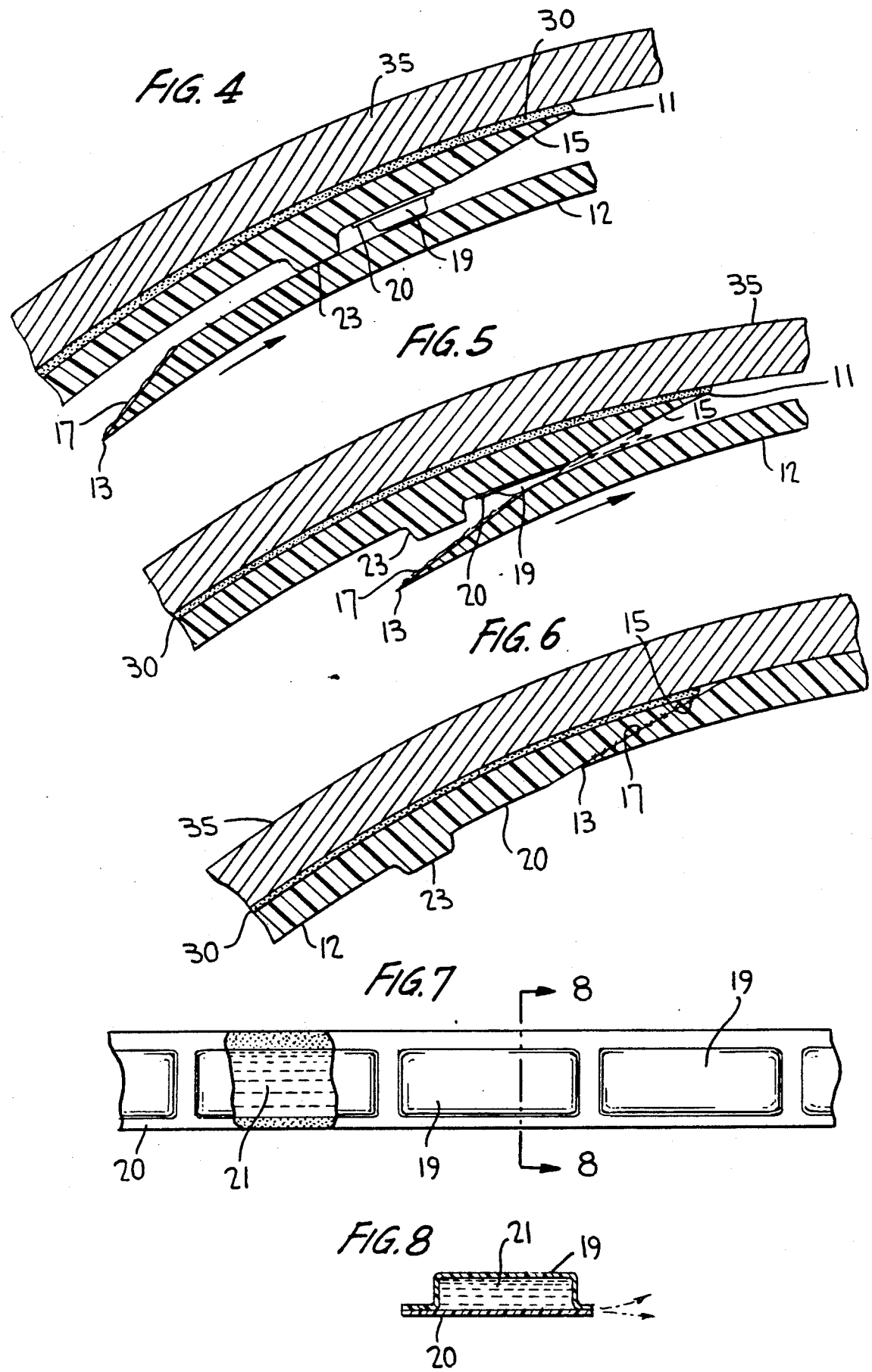

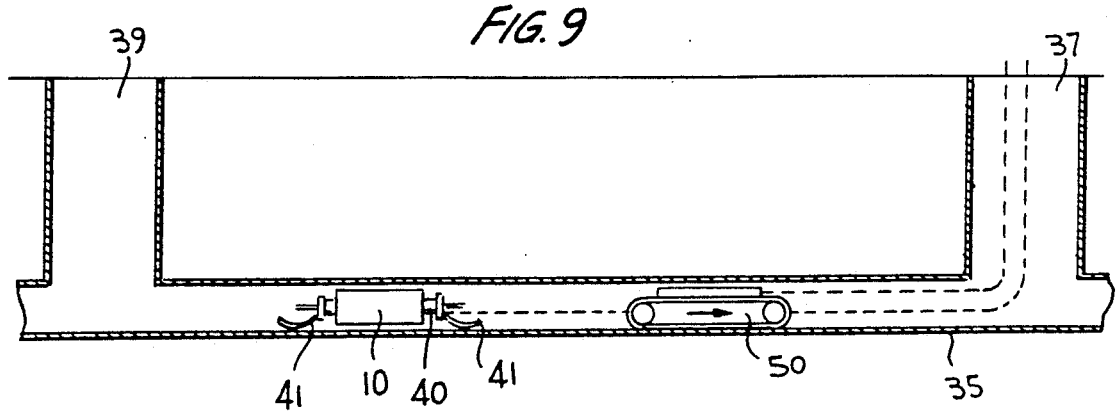
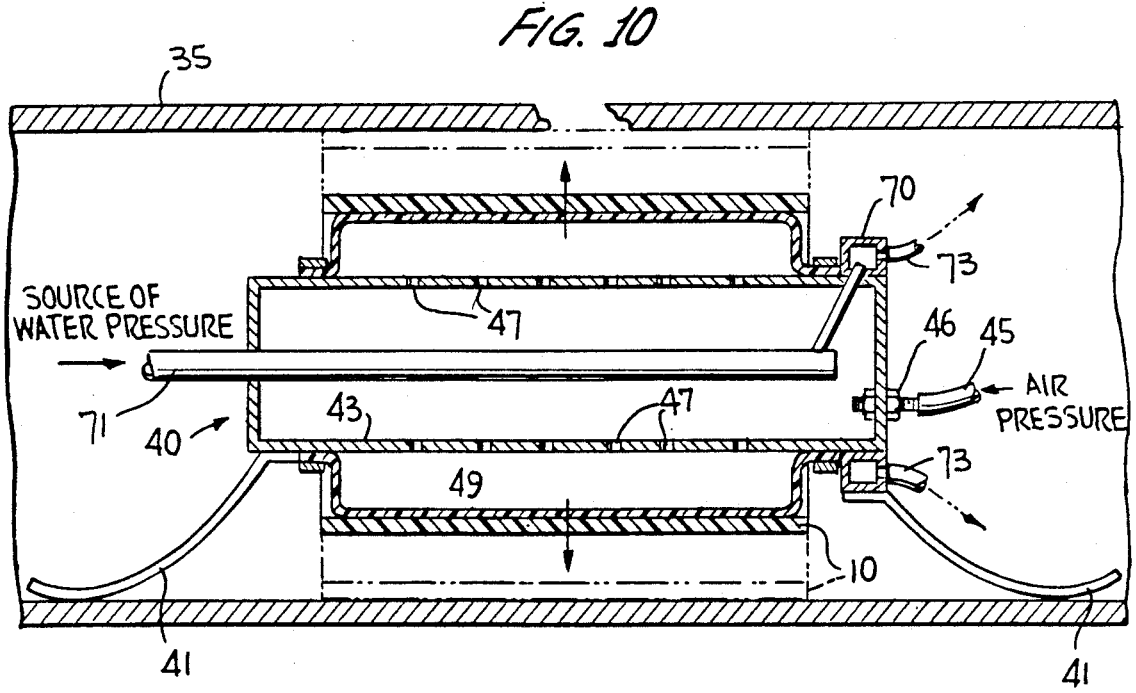
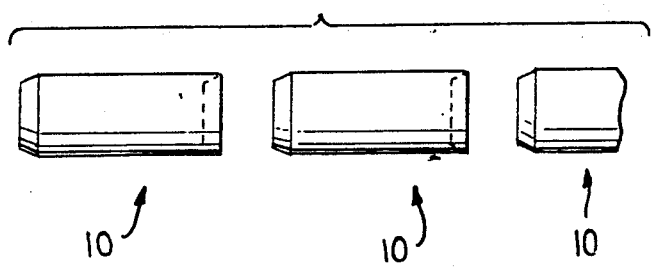

EXPANDABLE TUBE APPARATUS FOR REPAIRING PIPELINES

BACKGROUND OF THE INVENTION

1. Technical Field

The present invention relates to sealing leaks in and structurally repairing pipes and, more particularly, to a method and apparatus having utility in repairing and sealing leaks in pipelines that are substantially inaccessible to repair personnel. The present invention is described primarily for use in repairing sewer lines; however, it is to be understood that the invention has utility in the repair of substantially any pipeline, tunnel, conduit, shaft, etc.

2. Description of the Prior Art

Approximately half of the effluent treated at waste water treatment plants in the United States is the result of unintended infiltration and inflow into sewer pipe lines. In addition, as much as thirty percent of water and twenty-five percent of natural gas entering respective water and gas distribution systems is unaccounted for, presumably because of leakage from distribution pipelines. The age of many distribution systems assures that the problem will not disappear, yet the cost of replacing an entire system is enormous and, in most cases, prohibitive. Accordingly, it is desirable to provide an inexpensive and efficient technique for repairing leaks in existing pipelines. Several known approaches to the problem are outlined below.

Excavation is very commonly used to provide access to pipeline leaks so that the damaged section may be replaced or repaired in situ. However, excavation is extremely expensive and is disruptive of surface activities such as pedestrian and vehicular traffic. Moreover, in many instances it is impossible to reach the damaged pipe because numerous other pipes and conduits are disposed between the damaged pipe and the ground surface.

In another pipe repair approach, a lining of polymer and felt is disposed within the defective pipe section and cured in place. For example, see U.S. Pat. Nos. 4,064,211 and 4,581,247. The result is a new structural line that prevents infiltration of fluids into the pipe. Although functionally satisfactory for some applications, this approach tends to be expensive and also requires that the defective pipe section be removed from service during the curing process which lasts in excess of twenty-four hours. Moreover, this technique requires that the entire pipeline between two access openings (i.e., manholes) be relined, resulting in gross inefficiency when only a short section of pipe requires repair.

A technique known as slip lining, also relatively expensive, involves relining an entire pipe section between access openings with a rigid structural liner. In addition to being inefficient for short sections of defective pipe, this technique requires excavation in order to attach the repaired section to lateral service lines.

Various internal seals are effectively utilized for certain types of pipe defects but require human access within the defective pipe section and are therefore limited to pipes having inside diameters of at least twenty-four inches.

Another prior art seal unit takes the form of arcuate plates having foam glued to their convex surfaces and jointed by hinges. The seal is collapsed to a figure-eight and moved within the pipe to the location to be repaired, where jacks are then employed to force the plates into contact with the pipe wall. Such units have been known to collapse unexpectedly, thereby removing the repair seal while presenting a blockage inside the pipeline.

Still a further seal arrangement, sold under the trade name SNAP-LOCK, employs a stainless steel longitudinally slit tube that is partially rolled into a spiral to facilitate passage through a pipeline. A foam material is glued onto the outer surface of the tube which is disposed about a remoately actuated inflatable bag. When the tube is positioned in alignment with the defect in the pipe, as viewed by television monitoring, the bag is inflated to unroll the tube so that the foam is compressed against the pipe wall. The tube is biased to unroll so that it remains in place after the air bag is deflated. This apparatus has proven difficult to install because of friction introduced by the foam material coating, that acts in opposition to the unrolling of the tube when the bag is inflated. On the other hand, if foam having a lower coefficient of friction is employed, the foam tends to slide along the pipe wall and, accordingly, does not adequately seal the leak.

A somewhat different approach is found in U.S. Pat. No. 3,261,374 (Anderson et al) wherein a heat-reactive plastic tube is expanded by the application of thermal energy so as to tightly fit against the defective pipe wall. Immediately prior to insertion of the tube into the pipe, the exterior of the tube is coated with a tacky material that maintains the tube adhered to the pipe wall after the expanded tube is cooled. The application of the tacky substance at the repair site is inconvenient at best, and is also time-consuming and expensive. Moreover, the tacky substance renders the tubing difficult to transport through the pipeline.

OBJECTS AND SUMMARY OF THE INVENTION

Accordingly, it is an object of the present invention to provide a method and apparatus for structurally repairing a localized or point defect, or other damaged short section, of a pipeline in an economical and convenient manner without requiring repair personnel to enter the pipeline, without interrupting surface traffic and with minimal interruption of pipeline service.

It is another object of the present invention to provide for structural repair of localized damage in a pipeline utilizing apparatus having a tacky sealant coating that is applied at the factory but nevertheless does not interfere with storage and transportation of the apparatus.

Yet another object of the present invention is to provide a remotely controlled apparatus for repairing leaks in pipelines wherein the aforementioned disadvantages are substantially eliminated.

In accordance with the present invention, a plastic tube is slit lengthwise and maintained in a radially and circumferentially constrained condition wherein one longitudinal edge is disposed radially inward and angularly displaced from the other. An outer plastic film sleeve surrounds the collapsed tube and is, in turn, surrounded by a circumferentially continuous gasket or sealant sleeve of gummy or tacky material. A scrim sleeve is disposed over the gasket sleeve to permit handling and transport of the unit without the sleeve material sticking to other surfaces and structures. The tube is selectively expanded by a remotely controlled inflatable bladder or mandrel to thereby expand the circumference of the gasket sleeve and urge that sleeve against the interior wall of the pipe section to be repaired. Preferably, the gasket sleeve forms a cohesive bond with the pipe section.

In order to prevent the tube from contracting after the mandrel is deflated, one or more rupturable packets of adhesive material are disposed proximate one of the longitudinal edges of the tube so as to be ruptured and issue the adhesive material between final overlapping portions of the tube. For this purpose, the circumferential length of the tube is slightly greater than that of the pipeline interior to assure that there are overlapping tube portions proximate the longitudinal edge of the tube when the tube is fully expanded by the inflated mandrel. The overlapping portions are tapered to assure that the thickness of the overlap joint is approximately equal to the thickness of the remainder of the tube. One or more projections from one or the other of the exterior and interior surfaces of the tube preclude mutual compression of the overlapping portions against one another until the tube is almost fully expanded, at which time the overlapping portions are forcefully urged together to rupture the adhesive packet and issue the adhesive material along the desired areas of the overlapping portions of the tube.

The outer film sleeve, which may serve to hold the tube in its constrained or collapsed condition, ruptures as the tube expands so as not to interfere with the expansion process. In addition, the film provides a low friction surface between the tube and the tacky gasket sleeve to permit smooth expansion of the tube without frictional interference from the gasket sleeve.

As the gasket sleeve is radially expanded, the scrim material becomes embedded therein. In other words, the tacky material is forced through the scrim interstices and covers the scrim material so that the latter does not interfere with the sealing function provided by the gasket sleeve. The tacky gasket sleeve is thus compressed against the pipe interior and serves as a permanent gasket between the expanded tube and the pipe.

An inner film sleeve may be disposed interiorly of the tube with its edges sealed to the outer film sleeve to thereby protect the tube and adhesive packet against moisture. Upon expansion of the tube the sealed film sleeve edges rupture, leaving the inner film sleeve to be flushed through the pipeline by the flowing fluid.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference characters, and wherein:

FIG. 4 is a detailed view in transverse section of portions of the pipeline repair element of FIGS. 2B and 3 shown during expansion of the element as part of a pipeline repair operation;

FIG. 5 is a detailed view in transverse section of the same portion of the pipeline repair element illustrated in FIG. 4 but shown at a subsequent instant of time during expansion of the element;

FIG. 6 is a detailed view in transverse section of the same portions of the pipeline repair element illustrated in FIGS. 4 and 5 but shown after complete expansion of the element;

FIG. 7 is a top view in plan of a strip of adhesive packets employed in the pipeline repair element of the present invention;

FIG. 8 is a view in transverse section taken along lines 8—8 of FIG. 7;

FIG. 9 is a diagrammatic illustration of the pipeline repair element of the present invention being positioned for installation in a pipeline;

FIG. 10 is a view in longitudinal section showing the pipeline repair element of the present invention being installed at a damaged section of a pipeline; and FIG. 11 is an exploded view illustrating how a plurality of pipeline repair elements of the present invention may be cascaded.

DESCRIPTION OF THE PREFERRED EMBODIMENTS

Figure 1:
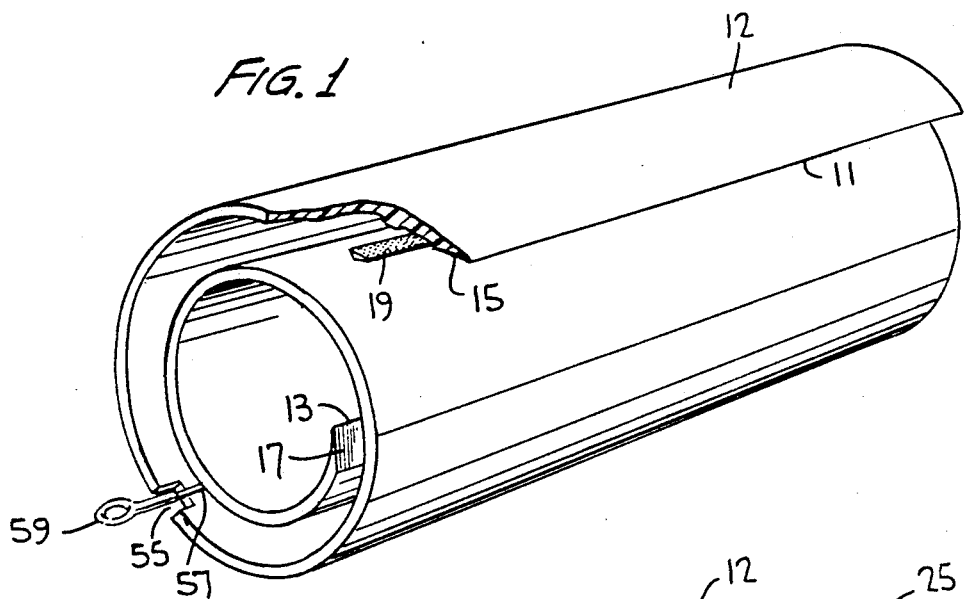
FIG. 1 is a view in perspective of a tube employed as a component of the pipeline repair element of the present invention.
Figure 2A:
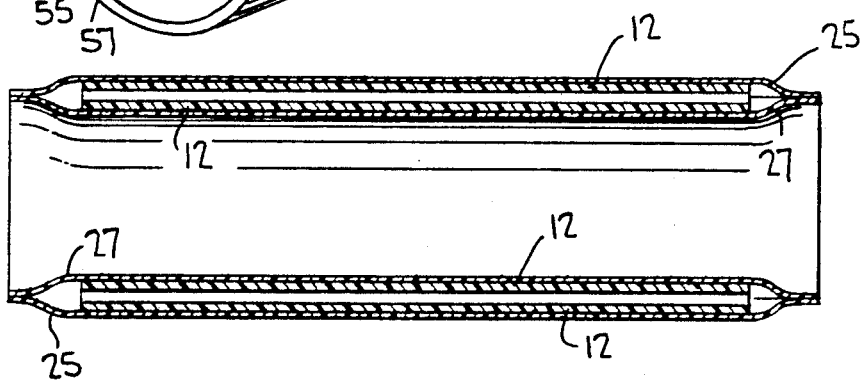
FIG. 2A is a view in longitudinal section of the tube of FIG. 1 encased between two film sleeves at an intermediate stage of manufacture of the pipeline repair element of the present invention.
Figure 2B:
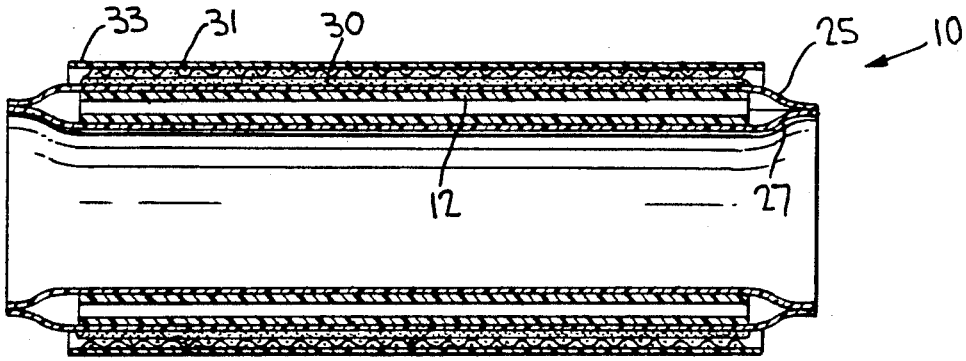
FIG. 2B is a view in longitudinal section of the completed pipeline repair element of the present invention shown in its collapsed, pre-installation condition.
Figure 3:
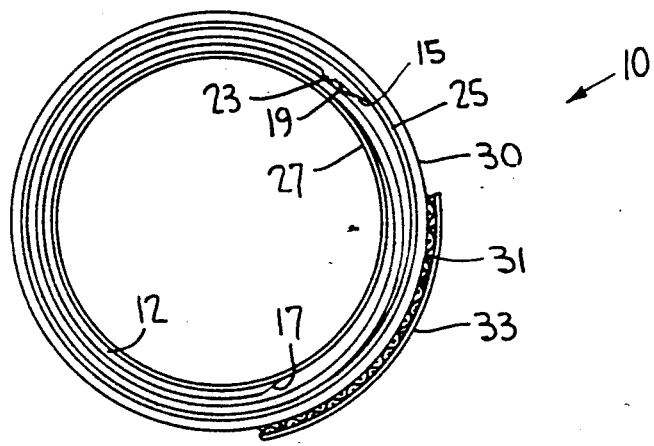
FIG. 3 is a view in transverse section of the pipeline repair element of FIG. 2B.

Referring specifically to the accompanying drawings, a pipeline repair unit 10 constructed in accordance with the present invention includes a tube 12 of plastic or metal material slit longitudinally to provide two longitudinal edges 11, 13. The preferred material for tube 12 is polyvinylchloride (PVC) but any metal or plastic material consistent with the functional requirements described herein may be employed. Tube 12 is formed as a flat sheet of material that is cut to the appropriate size, after which the longitudinal edges 11, 13 are bevelled or tapered in the circumferential dimension of the tube at 15, 17, respectively. Tapered portion 15 is formed by removing material from the surface that constitutes the outer surface of tube 12, whereas tapered portion 17 is formed by removing material from the inner surface of the tube. The tapered portions 15, 17 are juxtaposed when the repair unit 10 is installed in a pipeline (see FIG. 6) and are configured such that the thickness of the juxtaposed tapered portions corresponds to the thickness of the sheet of material from which tube 12 is formed. As a consequence, the tube thickness is uniform about the entire circumferential dimension of the tube. The sheet from which tube 12 is formed is then heated in an oven to its softening point and formed about a mandrel to approximately the diameter of the pipe to be repaired. Alternative methods for forming tube 12 may be employed (e.g., extrusion, etc.), as desired. In any case, the forming step serves to bias the tube generally toward its unrolled condition wherein the tapered portions 15, 17 are juxtaposed as seen in FIG. 6.

At least one rupturable packet 19 containing adhesive material 21 is disposed on the interior surface of tube 12 at a location adjacent, but preferably not on, tapered portion 15. In the preferred embodiment of the invention, a plurality of packets 19 take the form illustrated in FIGS. 7, 8 wherein a strip 20 of plastic material carries the series of packets 19. The packets, when secured by cement, or the like to tube 12, are arranged in parallel alignment with longitudinal edge 11. The function of adhesive material 21 is to adhesively join the two tapered portions 15, 17 when tube 12 is fully unrolled during an installation procedure of repair unit 10 to seal a section of pipe. In this regard the packets 19 are constructed to rupture when compressed, and are positioned to issue the adhesive material along tapered portion 15.

In order to prevent premature rupture of packets 19 during unrolling of tube 12, a projection 23 is disposed on the interior surface of tube 12 in a position to prevent the outer surface of the tube from compressing and rupturing packets 19 during the unrolling of tube 12 until immediately before tapered portions 15 and 17 reach juxtaposition. This sequence of movement is illustrated in FIGS. 4, 5 and 6. Projection 23 may take the form of a single longitudinal ridge formed integrally with or otherwise attached to tube 12, or a series of dimples aligned longitudinally, etc. and is located adjacent packets 19 along the side of the packets opposite tapered portions 15.

In order to constrain tube 12 in its rolled-up condition for transportation and storage prior to use, an outer film sleeve 25 of polyethylene, or the like, is disposed about the tube. Outer film sleeve 25 has a diameter sufficiently smaller than the diameter of the unrolled tube 12 to thereby permit the thusly constrained tube to be transported longitudinally through the pipeline in which a repair is to be made. An inner film sleeve 27 of similar material is disposed inside the rolled-up tube 12 and has its ends heat sealed to the corresponding ends of outer film sleeve 25 to provide a moisture proof seal for tube 12 and adhesive packets 19.

A gasket sleeve 30 circumferentially surrounds outer film sleeve 25 and is made of a gum-like, tacky material such as polymer-modified asphalt. The gasket sleeve material is deformable and stretchable without breaking so that, upon the complete unrolling of tube 12, gasket sleeve 30 may expand radially and circumferentially with the tube 12 while experiencing a reduction in thickness. Gasket sleeve 30 is ultimately urged against the interior wall of the defective pipe section by the unrolled tube 12 so as to provide a fluid seal between the tube and pipe section. The material of gasket sleeve 30 adheres to the interior surface of the pipe section and conforms to any irregularities therein. Preferably, but not necessarily, the gasket sleeve bonds cohesively to the pipe section.

The nature of the gasket sleeve material is such that it tends to stick to most surfaces and materials. While this is advantageous for a sealing gasket, it presents difficulties when attempting to transport the unit through a pipeline to the defective section. Accordingly, one or more layers of scrim material may be formed as a sleeve 31 and constrained in relatively taut condition about the gasket sleeve 30. Typical scrim material for this purpose is the type commonly employed as package material for oranges, grapefruits, and the like. Such material presents a relatively dense surface when in a constrained condition, thereby permitting the unit to be moved through a pipeline without any impediment resulting from the tacky gasket sleeve 30. As tube 12 begins to unroll, the scrim sleeve 31 is pulled more tightly and becomes embedded in the radially expanding gasket sleeve 30. In other words, the gasket sleeve material "flows" through the scrim interstices to envelop the scrim which thereby is prevented from interfering with the sealing function of the gasket sleeve.

Although the scrim sleeve 31 should be sufficient to prevent the repair unit from sticking to other units and other surfaces during transportation and storage, a layer 33 of release paper may be placed about the unit and peeled off prior to installation.

In operation, with reference to FIGS. 9 and 10, the repair unit 10 is transported to a defective pipe section by placing the unit on a mandrel assembly 40 which is, in turn, mounted on skids 41. The mandrel assembly may be towed by a motorized tractor unit 50 of the type commonly employed to pull inspection television cameras through a sewer line. Conventionally, such a camera (not shown) is employed with the mandrel assembly 40 to permit visual location of a leak or other defect in a pipeline 35. Alternatively, the camera and skid unit may be towed directly by an above-ground power winch. The tractor 50 and mandrel 40 are inserted into the main sewer line 35 via a manhole 39 or other access opening. Tractor 50 pulls the mandrel assembly 40 (and the inspection camera) through the sewer line toward the next manhole 37. An instrument van with appropriate control and monitoring equipment is typically located at ground level adjacent manhole 37 to permit control over movement of the tractor and camera as well as control over the injection of appropriate fluids under pressure.

Mandrel assembly 40 may include a rigid hollow cylindrical manifold 43, the interior of which receives pressurized air from an air tube 45 via a fitting 46 located at one end of the manifold. Multiple ports 47 are defined through the cylindrical wall of manifold 43 and are normally covered by an inflatable bladder sleeve 49. The bladder sleeve is clamped at its ends in fluid sealing relation to the outside of the manifold 43 so that, upon pressurization of the interior of the manifold, air flows through ports 47 to inflate the bladder sleeve. Upon inflation, bladder sleeve 49 forces repair unit 10 to unroll, as indicated progressive in FIGS. 4, 5 and 6. During most of the unrolling procedure, as illustrated in FIG. 4, the packets 19 are protected against compression and rupture by projection 23. As the tapered portion 17 passes projection 23, as illustrated in FIG. 5, the radial pressure exerted by manifold 43 on the innermost portions of tube 12 force those innermost portions against packets 19 to thereby rupture the packet and issue adhesive material along the tapered portion 15 of the tube. When the tube 12 is fully unrolled, as illustrated in FIG. 6, the tapered portions 15 and 17 are in adjacent juxtaposition and are quickly adhered together by the adhesive material disposed therebetween.

It is possible, during the installation of repair unit 10, that debris might be trapped between the repair unit 10 and the pipeline wall. For example, a trapped rock could significantly impede the expansion of the repair unit 10 and adversely affect the sealing function of the repair unit. In order to preclude this possibility, the manifold assembly 40 may be provided with a liquid spray unit 70 in the form of a ring disposed about one end of manifold 43 and including an annular conduit adopted to receive pressurized water or other cleaning liquid via a supply tube 71. A series of nozzles emanate from the conduit and are oriented to issue the pressurized cleaning liquid to flush debris from the interior surface of the pipeline. The conduit and nozzles are disposed at the end of mandrel assembly 40 which constitutes the forward end of that assembly as it moves through pipeline 35. Accordingly, debris is flushed from the pipeline walls ahead of the moving mandrel assembly. The debris which is loosened from the walls of the pipeline is eventually flushed through the pipeline by normal effluent.

The structural characteristics of the repair unit are determined by the thickness, tensile strength and modulus of elasticity of the sheet from which tube 12 is formed. For example, a sheet that is 0.200 inches thick and made of PVC Type 1 material has a strength approximately 64% of that of standard SDR35 sewer pipe, whereas a sheet of similar material having a thickness of 0.100 inches has a strength of only 8% of that of the same pipe. The thickness of the sheet must be limited, of course, in order to avoid restriction of flow in the pipeline being repaired; however, for a practical thickness of the sheet, the restriction of flow is only on the order of one or two percent. Typically, a thickness of 0.200 inches for the sheet is employed for unit 10. In order to repair a pipe section having a diameter of eight inches, the diameter of the preform mandrel for forming tube 12 is approximately six inches. This permits tube 12 to be reduced in size to an outside diameter of about five inches when packaged and yet expanded to a diameter of eight inches without requiring undue radial forces.

The length of tube 12 is determined by the capability of the fabrication equipment. If the tube is to be extruded, virtually any length can be achieved. From a practical point of view, the length need be no greater than the longest section that can be placed into the pipeline to be repaired. In the case of sewer pipes, this would be approximately two feet, which is determined by the typical access in a manhole.

The diameter of tube 12 is determined such that there is at least a two inch overlap of the tapered portions 15, 17 for the glue joint when the repair unit 10 is fully installed. The tapered portions 15, 17 are typically three inches in length along the circumferential dimension of the tube.

The foregoing describes a significant advantage of the present invention. ASTM C-412, the "Standard Specification of Concrete Drain Tile", specifies that the inside diameter of a nominal 8-inch pipe shall be 8 inches ±⅜ inches. This means that the circumference of the repair device must be variable from 26.31 to 23.95 inches. In addition, pipe which has been in service usually has experienced chemical or mechanical erosion of the sidewalls, thereby further varying the inside circumference of the pipe. Prior art repair units cannot accommodate this range of diameters. The repair unit of the present invention, because of the permissible slack in the overlap provided in the tapered portions 15, 17 in the final unrolled condition of the unit, easily accommodates this range of diameters.

As described above, the purpose of the adhesive material 21 is to secure the overlapping tapered portions 15 and 17 together to form an integral cylinder or tube when the repair unit is installed. A preferred adhesive material for this purpose is an acrylic monomer, that polymerizes when exposed to a catalyst. For example, such an acrylic monomer is made available commercially by the Lord Manufacturing Company under the trade name Versilok 202. An appropriate catalyst, made available by the same company, is Accelerator Number 4 which is preferably pre-applied to the tapered surfaces 15, 17 where the adhesive joint is desired. The packets 19 in which the adhesive material is stored are similar to the flexible condiment packages made familiar in fast food restaurants. The strip 20 on which the packets 19 are secured is typically glued with contact cement to the surface of tube 12 adjacent the area where the adhesive joint is ultimately to reside. The preferred material for packets 19 is a nylon/foil/polyethylene film such as the type marketed under the trade name Marvelseal 360. A packet 19 is typically one inch wide and two inches long and is heat sealed to strip 20. The heat seal is typically one-quarter inch wide along three of the sides, but only one-eighth inch wide along the side facing the tapered surface 15 so as to prime that side to rupture when the packet is compressed in the manner illustrated in FIGS. 5 and 6. In this manner the direction in which the adhesive material issues can be predetermined.

Projection or spacer 23 maintains the space between the adjacent unrolling portions of the tube 12 so that packets 19 are not prematurely ruptured. As the tube unrolls, the inner segment of the tube contacts but does not compress the packets until tapered portion 17 clears projection 23. At this time the entire radial pressure of the expanding mandrel assembly 40 is applied to the packets 19 which burst and force the adhesive material 21 along tapered surface 15.

Once the adhesive material comes into contact with the catalyst that has been pre-coated on the tapered surfaces 15, 17, the polymerizing process begins. For approximately thirty seconds it is possible for the joint to continue expanding so as to seat firmly against the wall of the pipe to be repaired. Within two minutes, however, the adhesive has achieved sufficient working strength and the installation process is completed.

A variety of different types of packet 19 may be employed within the scope of the present invention. The key feature is to provide a container having a weak point so as to control the flow direction of the contained adhesive material at rupture. The weak point must have sufficient strength to contain the adhesive during handling and shipping but must burst at the time the radial pressure is applied directly to the packet.

In addition to the specific adhesive material and catalyst described above, it is also possible to use a two-part epoxy. Under such circumstances the packets would include two fluid-isolated sections arranged such that when the packets burst, the two epoxies mix and subsequently cure. Solvent-type adhesives, such as tetrahydorfuran and cyclohexanone may be employed for this purpose. However, the curing time requirement for these materials is not as short as for the materials described above.

Although the packets 19 and projection 23 are shown disposed on the interior surface of tube 12 adjacent tapered portion 15, it will be appreciated that the packets and projection may alternatively located on the exterior surface of tube 12 adjacent tapered portion 17.

Two notches 55 (only one of which is illustrated in FIG. 1) are defined at opposite ends of tube 12 in order to locate a cable 57 used to pull the repair unit through a pipeline. Cable 57 has an eye 59 at each end adapted to be engaged by a hook of a towing cable (not illustrated). The eyes 57 fit into respective notches 55 such that, in the compressed configuration of the repair unit 10, the attachment device is trapped between the inner and outer layers of the tube 12. As the repair unit 10 is expanded to the point where the inner edge 13 passes cable 57, the cable 57 is allowed to freely drop into the center of the repair unit 10 where it can be removed. Prior to this, the eyes 59 are trapped by the notches 55, thereby preventing the unit from moving in a circumferential direction during installation. The cable 57 may also serve the function of projection or spacer 23, if properly located, to preclude premature compression of packets 19 during the expansion of the tube 12 upon installation.

The outer film sleeve, as noted above, is typically polyethylene film, and may have a thickness in the range of 0.0005 to 0.006 inches; the optimum thickness has proven to be 0.003 inches. The inner polyethylene film sleeve will typically have the same thickness. Upon expansion of tube 12 during installation, the heat seal between film sleeves 25 and 27 ruptures so that the inner film sleeve may be washed down the pipeline with effluent. The outer film sleeve 25 provides three primary functions, namely: constraining the tube 12 prior to installation; maintaining tube 12 dry; and providing a relatively low coefficient of friction to thereby allow the tube 12 to unroll or expand smoothly during the installation process.

The tacky gasket sleeve material, as noted above, is preferably polymer-modified asphalt, a very plastic material having the capability of stretching up to eight hundred percent without breaking. Such material is manufactured by Owens Corning Fiberglas. The unstretched gasket sleeve is typically about 0.120 inches thick. As the repair unit 10 is expanded during installation, the gasket sleeve material expands and effectively reduces its thickness to about 0.100 inches to form the gasket between the wall of the pipeline to be repaired and the expanding tube 12. The polymer-modified asphalt adheres to the sidewall of the pipeline and conform to any irregularities in its surface. Alternative materials for gasket sleeve 30 might be closed cell foam rubber or other low durometer rubbers. However, polymer-modified asphalt is far and away the optimum material. A disadvantage of the polymer-modified asphalt is that it tends to stick to most surfaces. This, of course, is an advantage when the material is employed as a gasket, but the material makes it impractical to move the repair unit 10 to the location of the defect in a pipeline. It is for this purpose that the scrim sleeve 31 is employed.

As illustrated in FIG. 11, a plurality of repair units 10 may be installed in cascade or series to repair a relatively long section of pipeline. This is accomplished by tapering the ends of the repair units so as to permit the end of one unit to be partially received in the opposite end of another unit. For this purpose one end of the unit is necked down slightly such that it will smoothly interlock with the opposite end of another unit.

The preferred embodiment of the repair unit 10 described above is constructed as a straight cylinder. This causes an abrupt minor change in the diameter of the repaired pipeline at the end points of the repair unit (i.e., typically about 0.250 inches diameter reduction). This in turn slightly increases the flow resistance and degrades the flow characteristics. It is possible to form the tube 12 such that the ends have a slightly smaller diameter (i.e., reduced thickness) than the center portion so that, when the unit is installed it presents a gentle transition from the inside diameter of the pipe to be repaired to the inside diameter of the repair unit 10.

In an installation procedure, a conventional television camera is used to locate a defect to be repaired. The repair unit is typically attached to the skid mounted mandrel assembly 40 which is then moved via cables and/or tractor to the center point of the defect as viewed by the inspection camera. Once the mandrel assembly 40 is centered, the bladder sleeve is inflated to approximately 90 psi pressure, which causes the repair unit 10 to expand. The expanded repair unit seats against the sidewall of the pipe to be repaired and causes the adhesive packets to burst. After a period of approximately two to five minutes the adhesive is cured to the extend that the mandrel can be deflated and moved away from the repair site.

As described in the background section herein, a prior art approach to pipe repair utilizes a lining of polymer and felt to be disposed within the defective pipe section and cured in place. If a pipe is to be so relined has a large segment missing, there is only one alternative available in using that prior art technique. Specifically, the thickness of the polymer and felt lining must be increased to assure that the material has sufficient strength to resist the forces exerted at the defect during normal use. Adding the additional thickness is expensive since the thickness of the entire line must be increased merely because of the need for repair at a single point. It is possible to install a repair unit 10 of the present invention at the location of the defect to provide the additional structural strength. If this were done, it would only be necessary to install the tube 12 and not the gasket sleeve 30 since the latter would not be required.

From the foregoing description it will be seen that the invention makes available a novel method and apparatus wherein a defect in a pipeline can be simply and easily repaired on a permanent basis without significant loss of time of service for the pipeline.

Having described preferred embodiments of a new and improved Method and Apparatus for Repairing Pipelines in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. Apparatus for structurally repairing and sealing leaks in a pipeline having a known inside circumference and diameter, said apparatus comprising:

a tube having an interior surface, an exterior surface and a longitudinal slit extending the entire tube length to define first and second longitudinally-extending separate edges, said tube being partially rolled-up about a longitudinal axis such that its outer diameter is substantially smaller than the known inside diameter of said pipeline and such that said first edge is disposed radially inward and angularly displaced from said second edge, wherein said tube is capable of being unrolled, and wherein the outer circumferential length of said tube between said first and second edges is slightly greater than the inside circumference of said pipeline;

a circumferentially continuous gasket sleeve disposed about said rolled-up tube, said gasket sleeve being of a tacky and stretchable material such that, upon radial expansion of the tube, the circumference of said sleeve increases while the thickness of said sleeve decreases;

normally sealed and rupturable adhesive container means disposed on one of said interior and exterior surfaces of said tube proximate said first and second edges, respectively, for containing adhesive material capable of adhering said interior and exterior surfaces to one another and for emitting said adhesive material when said container means is ruptured;

wherein, upon the unrolling of said tube, overlapping areas of said interior and exterior surfaces are compressed against one another to cause said sealed adhesive container means to rupture and emit adhesive material that contacts and secures together final overlapping portions of said interior and exterior surfaces proximate said first and second edges, respectively.

2. The apparatus according to claim 1 further comprising selectively actuable means disposable interiorly of said tube for selectively unrolling said tube by exerting radial pressure on the interior surface of said tube.

3. The apparatus according to claim 2 wherein said selectively actuable means comprises an inflatable member that radially expands upon inflation to urge the overlapping areas of said interior and exterior surfaces toward one another while unrolling said tube.

4. The apparatus according to claim 1 wherein said tube is defined by a wall of substantially uniform thickness except at said final overlapping portions of said tube which correspondingly taper in thickness toward said first and second edges, respectively, such that the combined thickness of said final overlapping portions is substantially the same as said uniform thickness.

5. The apparatus according to claim 4 further comprising spacer means disposed between the overlapping areas of said interior and exterior surfaces at a location proximate said adhesive container means to prevent the other of said surfaces from bearing against said adhesive container means in said overlapping areas until said final overlapping portions of said surfaces are in mutual registration during the unrolling of said tube.

6. The apparatus according to claim 5 wherein said adhesive container means comprises a flexible plastic container disposed adjacent but not on the tapered final overlapping portions of said one surface, wherein at least a part of said flexible plastic container facing said adjacent tapered final overlapping portions is relatively structurally weak such that it readily ruptures upon radial compression of the container to issue the contained adhesive material toward said adjacent tapered final overlapping portions, and wherein said spacer means is disposed proximate the opposite side of said container from said adjacent tapered final overlapping portions.

7. Apparatus according to claim 6 wherein said adhesive container means comprises a series of said flexible plastic containers extending in a line lengthwise of said tube on said one surface.

8. Apparatus according to claim 7 wherein said spacer means comprises a ridge formed integrally with said tube on said one surface so as to project toward the other of said surfaces, said ridge extending lengthwise along said one surface.

9. The apparatus according to claim 6 further comprising cable means for pulling said apparatus through said pipeline to a location requiring repair, said cable means including a cable section disposed between the overlapping areas of said interior and exterior surfaces of the rolled-up tube and including means adapted to removably engage at least one part of said tube, wherein said spacer means comprises said cable section.

10. The apparatus according to claim 6 wherein the material of said gasket sleeve is sticky and has a gummy consistency, said apparatus further including a sleeve of scrim material disposed about said gasket sleeve to facilitate handling and transport of said apparatus, and wherein said scrim material becomes radially embedded in said gasket sleeve when the circumference of the gasket sleeve increases in response to radial expansion of said tube.

11. The apparatus according to claim 10 wherein said tube is pre-stressed to assume an unrolled condition, said apparatus further comprising a constraining sleeve of filmy material surrounding the rolled-up tube between said tube and said gasket sleeve for constraining said sleeve in its rolled up condition in the absence of forces applied interiorly of said tube to radially expand said tube, said constraining sleeve being sufficiently structurally weak to rupture in response to radial expansion of said tube in response to said interiorly applied forces.

12. The apparatus according to claim 11 wherein said filmy material has a much lower coefficient of friction than said gasket sleeve to minimize frictional opposition to unrolling said tube.

13. The apparatus according to claim 12 further comprising an interior sleeve extending interiorly through said tube in a longitudinal direction, wherein the opposite longitudinal ends of said interior sleeve are sealed to respective opposite longitudinal ends of said constraining sleeve beyond the ends of said tube in order to seal said tube between the constraining and interior sleeves;

wherein, upon radial expansion of said tube and rupture of said constraining sleeve, the interior sleeve tears away from the constraining sleeve and can be flushed through said pipeline.

14. The apparatus according to claim 11 wherein said adhesive material is of the type that polymerizes when exposed to a prescribed catalyst, and wherein said apparatus further includes a coating of said prescribed catalyst disposed on at least one of said interior and exterior surfaces in the region of the final overlapping portions.

15. The apparatus according to claim 5 further comprising cable means for pulling said apparatus through said pipeline to a location requiring repair, said cable means including a cable section disposed between the overlapping areas of said interior and exterior surfaces of the rolled-up tube and including means adapted to removably engage at least one part of said tube, wherein said spacer means comprises said cable section.

16. The apparatus according to claim 15 wherein said tube is pre-stressed to assume an unrolled condition, said apparatus further comprising a constraining sleeve of filmy material surrounding the rolled-up tube between said tube and said gasket sleeve for constraining said sleeve in its rolled-up condition in the absence of forces applied interiorly of said tube to radially expand said tube, said constraining sleeve being sufficiently structurally weak to rupture in response to radial expansion of said tube in response to said interiorly applied forces.

17. The apparatus according to claim 16 further comprising an interior sleeve extending interiorly through said tube in a longitudinal direction, wherein the opposite longitudinal ends of said interior sleeve are sealed to respective opposite longitudinal ends of said constraining sleeve beyond the ends of said tube in order to seal said tube between the constraining and interior sleeves;

wherein, upon radial expansion of said tube and rupture of said constraining sleeve, the interior sleeve tears away from the constraining sleeve and can be flushed through said pipeline.

18. The apparatus according to claim 15 wherein said adhesive material is of the type that polymerizes when exposed to a prescribed catalyst, and wherein said apparatus further includes a coating of said prescribed catalyst disposed on at least one of said interior and exterior surfaces in the region of the final overlapping portions.

19. The apparatus according to claim 5 wherein the material of said gasket sleeve is of sticky and has a gummy consistency, said apparatus further including a sleeve of scrim material disposed about said gasket sleeve to facilitate handling and transport of said apparatus, and wherein said scrim material becomes radially embedded in said gasket sleeve when the circumference of the gasket sleeve increases in response to radial expansion of said tube.

20. The apparatus according to claim 5 wherein said tube is pre-stressed to assume an unrolled condition, said apparatus further comprising a constraining sleeve of filmy material surrounding the rolled-up tube between said tube and said gasket sleeve for constraining said sleeve in its rolled-up condition in the absence of forces applied interiorly to radially expand said tube, said constraining sleeve being sufficiently structurally weak to rupture from radial expansion of said tube in response to said interiorly applied forces, wherein said filmy material has a much lower coefficient of friction than said gasket sleeve to minimize frictional opposition to unrolling said tube.

21. The apparatus according to claim 20 further comprising an interior sleeve extending interiorly through said tube in a longitudinal direction, wherein the opposite longitudinal ends of said interior sleeve are sealed to respective opposite longitudinal ends of said constraining sleeve beyond the ends of said tube in order to seal said tube between the constraining and interior sleeves;
wherein, upon radially expansion of said tube and rupture of said constraining sleeve, the interior sleeve tears away from the constraining sleeve and can be flushed through said pipeline.

22. The apparatus according to claim 5 wherein said adhesive material is of the type that polymerizes when exposed to a prescribed catalyst, and wherein said apparatus further includes a coating of said prescribed catalyst disposed on at least one of said interior and exterior surfaces in the region of the final overlapping portions.

23. The apparatus according to claim 4 wherein said adhesive container means comprises a flexible plastic container disposed adjacent but not on the tapered final overlapping portions of said one surface, wherein at least a part of said flexible plastic container facing said adjacent tapered final overlapping portions is relatively structurally weak such that it readily ruptures upon radial compression of the container to issue the contained adhesive material toward said adjacent tapered final overlapping portions, and wherein said spacer means is disposed on the opposite side of said container from said adjacent tapered final overlapping portions.

24. The apparatus according to claim 4 wherein the material of said gasket sleeve is sticky with a gummy consistency, said apparatus further including a sleeve of scrim material disposed about said gasket sleeve to facilitate handling and transport of said apparatus, and wherein said scrim material becomes radially embedded in said gasket sleeve when the circumference of the gasket sleeve increases in response to radial expansion of said tube.

25. The apparatus according to claim 4 wherein said tube is pres-stressed to assume an unrolled condition, said apparatus further comprising a constraining sleeve of filmy material surrounding the rolled-up tube between said tube and said gasket sleeve for constraining said sleeve in its rolled-up condition in the absence of forces applied interiorly to radially expand said tube, said constraining sleeve being sufficiently structurally weak to rupture in response to radial expansion of said tube in response to said interiorly applied forces, wherein said filmy material has a much lower coefficient of friction than said gasket sleeve to minimize frictional opposition to unrolling said tube.

26. The apparatus according to claim 25 further comprising an interior sleeve extending interiorly through said tube in a longitudinal direction, wherein the opposite longitudinal ends of said interior sleeve are sealed to respective opposite longitudinal ends of said constraining sleeve beyond the ends of said tube in order to seal said tube between the constraining and interior sleeves;
wherein, upon radial expansion of said tube and rupture of said constraining sleeve, the interior sleeve tears away from the constraining sleeve and can be flushed through said pipeline.

27. The apparatus according to claim 4 wherein said adhesive material is of the type that polymerizes when exposed to a prescribed catalyst, and wherein said apparatus further includes a coating of said prescribed catalyst disposed on at least one of said interior and exterior surfaces in the region of the final overlapping portions,.

28. The apparatus according to claim 1 wherein in said adhesive container means comprises a flexible plastic container disposed adjacent but not on the tapered final overlapping portions of said one surface, wherein at least a part of said flexible plastic container facing said adjacent tapered final overlapping portions in relatively structurally weak such that it readily ruptures upon radial compression of the container to issue the contained adhesive material toward said adjacent tapered final overlapping portions, and wherein said spacer means is disposed on the opposite side of said container from said adjacent tapered final overlapping portions.

29. The apparatus according to claim 1 wherein the material of said gasket sleeve is sticky with a gummy consistency, said apparatus further including a sleeve of scrim material disposed about said gasket sleeve to facilitate handling and transport of said apparatus, and wherein said scrim material becomes radially embedded in said gasket sleeve when the circumference of the gasket sleeve increases in response to radial expansion of said tube.

30. The apparatus according to claim 1 wherein said tube is pre-stressed to assume an unrolled condition, said apparatus further comprising a constraining sleeve of filmy material surrounding the rolled-up tube between said tube and said gasket sleeve for constraining said sleeve in its rolled-up condition in the absence of forces applied interiorly to radially expand said tube, said constraining sleeve being sufficiently structurally weak to rupture in response to radial expansion of said tube in response to said interiorly applied forces, wherein said filmy material has a much lower coefficient of friction than said gasket sleeve to thereby minimize frictional opposition to unrolling said tube.

31. The apparatus according to claim 30 further comprising an interior sleeve extending interiorly through said tube in a longitudinal direction, wherein the opposite longitudinal ends of said interior sleeve are sealed to respective opposite longitudinal ends of said constraining sleeve beyond the ends of said tube in order to seal said tube between the constraining and interior sleeves;

wherein, upon radial expansion of said tube and rupture of said constraining sleeve, the interior sleeve tears away from the constraining sleeve and can be flushed through said pipeline.

32. The apparatus according to claim 1 wherein said adhesive material is of the type that polymerizes when exposed to a prescribed catalyst, and wherein said apparatus further includes a coating of said prescribed catalyst disposed on at least one of said interior and exterior surfaces in the region of the final overlapping portions.

33. The apparatus according to claim 1 wherein a plurality of said tubes are arranged to fit longitudinally together in end-to-end relation.

34. Apparatus for use inside a pipeline having a known inside circumference and diameter in order to repair the pipeline wall and seal leaks therein, said apparatus comprising:

a gasket sleeve of sticky stretchable material having a gummy consistency that sticks to the pipeline wall, said gasket sleeve having opposite longitudinally-spaced ends and a circumferentially continuous intermediate section, said gasket sleeve having an outer circumference and diameter smaller than said known inside circumference and diameter of said pipeline; and a radially expandable tube disposed within said gasket sleeve for controllably radially expanding and circumferentially stretching said gasket sleeve while urging said gasket sleeve into abutting and sticking contact with the inside of said pipeline;

wherein said tube comprises:

a tube having an interior surface, an exterior surface and a longitudinal slit extending the entire tube length to define first and second longitudinally-extending separate edges, said tube being constrainable in a partially rolled-up condition about a longitudinal axis such that the outside diameter of the tube is substantially smaller than the diameter of said sleeve when unstressed, and such that said first edge is rolled inwardly of said second edge, said tube being pre-stressed to assume an unrolled condition when radially unconstrained, said tube in said unrolled condition having an outside circumference and diameter at least as large as said known circumference and diameter of said pipeline; and selectively removably constraining means for radially constraining said tube in said rolled-up condition;

wherein said selectively removably constraining means comprises a constraining sleeve of filmy material surrounding the rolled-up tube between said tube and said gasket sleeve in order to constrain said sleeve in a rolled-up condition in the absence of forces applied interiorly of said tube to radially expand said tube, said constraining sleeve being sufficiently structurally weak to rupture in response to radial expansion of said tube due to said interiorly applied forces, wherein said filmy material has a much lower coefficient of friction than said gasket sleeve to thereby minimize frictional opposition to unrolling said tube;

and further comprising an interior sleeve extending interiorly through said tube in a longitudinal direction, wherein the opposite longitudinal ends of said interior sleeve are sealed to respective opposite longitudinal ends of said constraining sleeve beyond the end of said tube in order to seal said tube between the constraining and interior sleeves;

wherein, upon radial expansion of said tube and rupture of said constraining sleeve, the interior sleeve tears away from the constraining sleeve and can be flushed through said pipeline;

wherein said constraining sleeve and said interior sleeve are tubes of polyethylene film;

wherein the circumference of said tube between said first and second edges is such that, when said tube is radially unconstrained, a first portion of said tube proximate said first edge is overlapping with and abutted by a corresponding second portion of said tube proximate said second edge, and wherein said tube tapers in thickness toward first and second edges at said first and second portions, respectively, to provide a combined thickness of said first and second portions that is substantially the same as the untapered thickness of said tube;

and further comprising adhesive means for securing said exterior surface at said first portion to said interior surface at said second portion when said tube is in said unrolled condition;

wherein said means for securing comprises:

a rupturable package of adhesive material positioned on one of said interior and exterior surfaces proximate one of said first and second portions, respectively, and arranged when ruptured to issue said adhesive material between said first and second portions;

means for rupturing said package during the unrolling of said tube as said first and second portions approach overlapping relation.

35. The apparatus according to claim 34 further comprising a sleeve of scrim material disposed about said gasket sleeve to facilitate handling and transport of said apparatus, wherein said scrim material becomes radially embedded in said gasket sleeve when the circumference of the gasket sleeve increases in response to radial expansion of said tube.

36. Apparatus for use inside a pipeline having a known inside circumference and diameter in order to repair the pipeline wall and seal leaks therein, said apparatus comprising: a gasket sleeve of sticky stretchable material having a gummy consistency that sticks to the pipeline wall, said gasket sleeve having opposite longitudinally-spaced ends and a circumferentially continuous intermediate section, said gasket sleeve having an outer circumference and diameter smaller than said known inside circumference and diameter of said pipeline; and a radially expandable tube disposed within said gasket sleeve for controllably radially expanding and circumferentially stretching said gasket sleeve while urging said gasket sleeve into abutting and sticking contact with the inside of said pipeline;

wherein said tube comprises:

a tube having an interior surface, an exterior surface and a longitudinal slit extending the entire tube length to define first and second longitudinally-extending separate edges, said tube being constrainable in a partially rolled-up condition about a longitudinal axis such that the outside diameter of the tube is substantially smaller than the diameter of said sleeve when unstressed, and such that said first edge is rolled inwardly of said second edge, said tube being pre-stressed to assume an unrolled condition when radially unconstrained, said tube in said unrolled condition having an outside circumference and diameter at least as large as said known circumference and diameter of said pipeline; and selectively removable constraining means for radially constraining said tube in said rolled-up condition; wherein the circumference of said tube between said first and second edges is such that, when said tube is radially unconstrained, a first portion of said tube proximate said first edge is overlapping with and abutted by a corresponding second portion of said tube proximate said second edge, and wherein said tube tapers in thickness toward first and second edges at said first and second portions, respectively, to provide a combined thickness of said first and second portions that is substantially the same as the thickness of the remainder of said tube; and further comprising adhesive means for securing said exterior surface at said first portion to said interior surface at said second portion when said tube is in said unrolled condition;

wherein said means for securing comprises:

a rupturable package of adhesive material positioned on one of said interior and exterior surfaces proximate one of said first and second portions, respectively, and arranged when ruptured to issue said adhesive material between said first and second portions; and means for rupturing said package during the unrolling of said tube as said first and second portions approach overlapping relation.

37. Apparatus for structurally repairing and sealing leaks in a pipeline having a known inside circumference and diameter, said apparatus comprising:

a tube having an interior surface, an exterior surface and a longitudinal slit extending the entire tube length to define first and second longitudinally-extending separate edges, said tube being partially rolled-up about a longitudinal axis such that its outer diameter is substantially smaller than the known inside diameter of said pipeline and such that said first edge is disposed radially inward and angularly displaced from said second edge, wherein said tube is capable of being unrolled, and wherein the outer circumferential length of said tube between said first and second edges is slightly greater than the inside circumference of said pipeline;

normally sealed and rupturable adhesive container means disposed on one of said interior and exterior surfaces of said tube proximate said first and second edges, respectively, for containing adhesive material capable of adhering said interior and exterior surfaces to one another and for emitting said adhesive material when said container means is ruptured;

wherein, upon the unrolling of said tube, overlapping ares of said interior and exterior surfaces are compressed against one another to cause said sealed adhesive container means to rupture and emit adhesive material that contacts and secures together final overlapping portions of said interior and exterior surfaces proximate said first and second edges, respectively.

38. The apparatus according to claim 37 further comprising selectively actuable means disposable interiorly of said tube for selectively unrolling said tube by exerting radial pressure on the interior surface of said tube, and wherein said selectively actuable means comprises an inflatable member that radially expands upon inflation to urge the overlapping areas of said interior and exterior surfaces toward one another while unrolling said tube.

39. The apparatus according to claim 37 wherein said tube is defined by a wall of substantially uniform thickness except at said final overlapping portions of said tube which correspondingly taper in thickness toward said first and second edges, respectively, such that the combined thickness of said final overlapping portions is substantially the same as said uniform thickness.

40. The apparatus according to claim 37 further comprising spacer means disposed between the overlapping areas of said interior and exterior surfaces at a location proximate said adhesive container means to prevent the other of said surfaces from bearing against said adhesive container means in said overlapping areas until said final overlapping portions of said surfaces are in mutual registration during the unrolling of said tube.

41. The apparatus according to claim 40 wherein said adhesive container means comprises a flexible plastic container disposed adjacent but not on the tapered final overlapping portions of said one surface, wherein at least a part of said flexible plastic container facing said adjacent tapered final overlapping portions is relatively structurally weak such that it readily ruptures upon radial compression of the container to issue the contained adhesive material toward said tapered final overlapping portions, and wherein said spacer means is disposed proximate the opposite side of said container from said adjacent tapered final overlapping portions.

42. Apparatus according to claim 41 wherein said adhesive container means comprises a series of said flexible plastic containers extending in a line lengthwise of said tube on said one surface.

43. Apparatus according to claim 42 wherein said spacer means comprises a ridge disposed on said one surface so as to project toward the other of said surfaces, said ridge extending lengthwise along said one surface.

* * * * *